Figure 1:
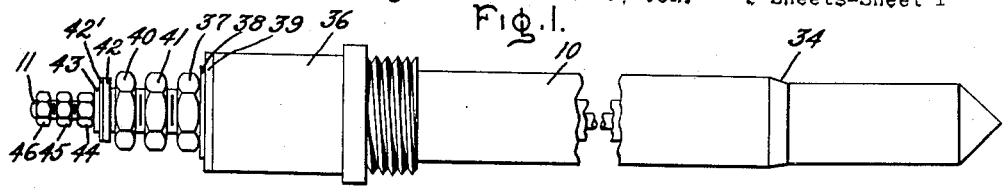

May 20, 1924.

C. C. ABBOTT

ELECTRIC HEATER

Original Filed Oct. 5, 1921   2 Sheets-Sheet 1

1,494,936

Inventor:
Charles C. Abbott,
by Albert G. Davis
His Attorney.

May 20, 1924.
C. C. ABBOTT
ELECTRIC HEATER
Original Filed Oct. 5, 1921   2 Sheets-Sheet 2
1,494,936
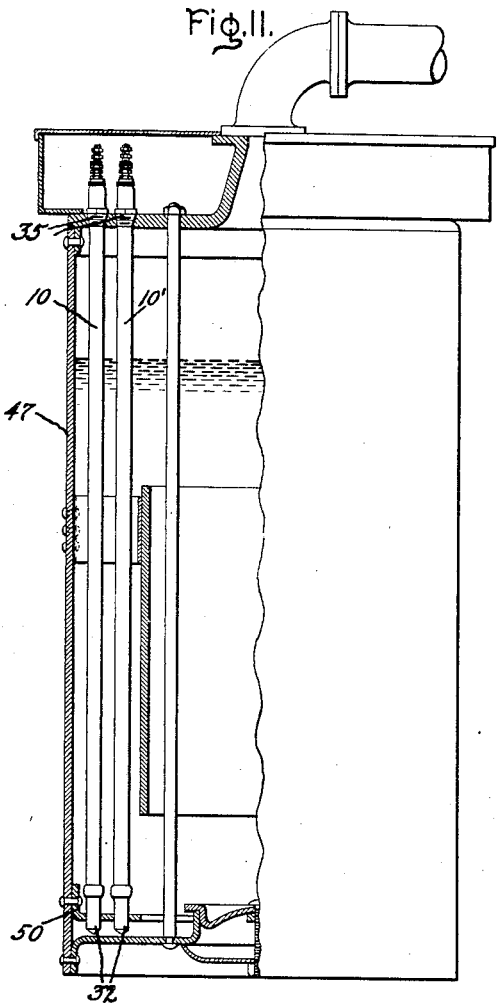
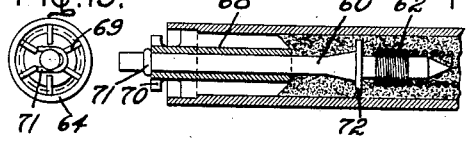
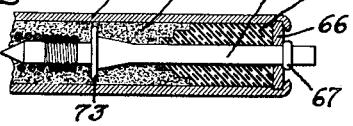
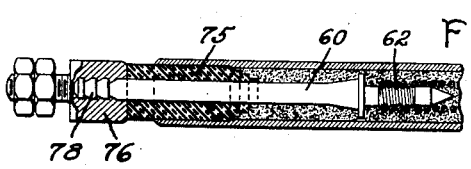
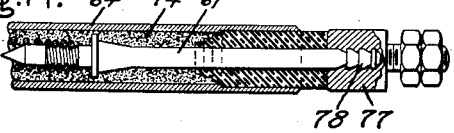
Inventor:
Charles C. Abbott,
by [signature]
His Attorney.

Patented May 20, 1924.

1,494,936

UNITED STATES PATENT OFFICE.

CHARLES C. ABBOTT, OF PITTSFIELD, MASSACHUSETTS, ASSIGNOR TO GENERAL ELECTRIC COMPANY, A CORPORATION OF NEW YORK.

ELECTRIC HEATER.

Application filed October 5, 1921, Serial No. 505,588. Renewed February 12, 1924.

*To all whom it may concern:*

Be it known that I, CHARLES C. ABBOTT, a citizen of the United States, residing at Pittsfield, in the county of Berkshire, State of Massachusetts, have invented certain new and useful Improvements in Electric Heaters, of which the following is a specification.

My invention relates to electric heaters and has for its object the provision of a simple, reliable, and economical electric heating unit for steam boilers and the like, which is particularly adapted for use on high voltage circuits.

More specifically my invention relates to heating units of the type which are compacted to a hard dense mass by swaging. One form of such a unit is described and claimed in my U. S. Patent No. 1,367,341, dated February 1, 1921, and assigned to the same assignee as this invention. In heating units of this general type the resistance conductor is embedded in powdered insulating material contained in a metallic sheath, the insulating material being compacted to a hard dense mass around the resistance conductor by reducing the diameter of the sheath by swaging. Terminals projecting from the sheath are provided for the resistance conductor. To provide for good heat conductivity from the resistance conductor, the layer of insulating material is made very thin. While the insulating property of this thin layer of insulating material is ample in the body of the unit for comparatively high voltage circuits, its thickness is not great enough to leave sufficient electrical clearance between the terminal and the sheath at the point where the terminal projects from the sheath. Nor can this clearance be increased by exposing the insulating material for a short length for the reason that it crumbles when the sheath is removed. In order therefore to adapt heating units of this type for use on relatively high voltage circuits, an insulator must be provided for the terminals. It is desirable to secure the insulator to the sheath by swaging during the course of the construction of the heating unit, in this manner forming a structure which is compact and rugged and also impervious to moisture. In order to use this method of construction, an insulator must be provided which is adapted to withstand the swaging operation without having its insulating properties impaired. Furthermore in heating units for steam boilers it is often desirable to bring out both terminals at one end of the unit.

In carrying out my invention, I provide in one form thereof a solid metallic terminal which extends the full length of the unit, and surrounding this terminal and insulated therefrom I provide a tubular terminal which extends into the unit for a short distance. I have provided an insulator for the tubular terminal which consists of alternate layers of mica and asbestos rolled into a cylinder and compacted by swaging. This insulator may be assembled in the unit before the final swaging operation, which further compacts it, the layer of asbestos being yieldable to allow the mica to adjust itself without breaking, crumbling or otherwise having its insulating properties destroyed. In further adapting the unit for operation on steam boilers, I provide a bushing near the terminal end of the unit which is adapted when the unit is inserted in the boiler to be secured to the boiler shell. The inner end of the unit engages a spacing member in the boiler so as to be held against vibration. In a modified form of my invention adapted for low temperature work, I have provided a terminal insulator made of bakelite or a similar yieldable material which will withstand swaging.

Figure 2:
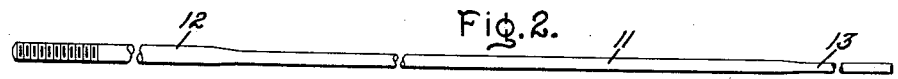
Figure 3:
Figure 4:
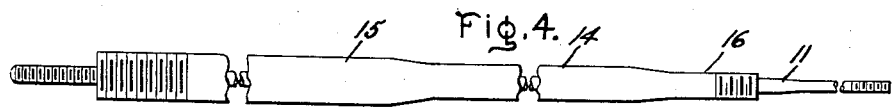
Figures 5, 6:
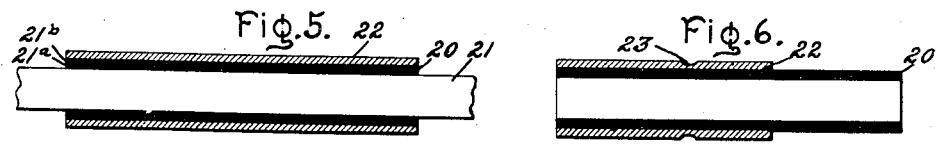
Figure 7:
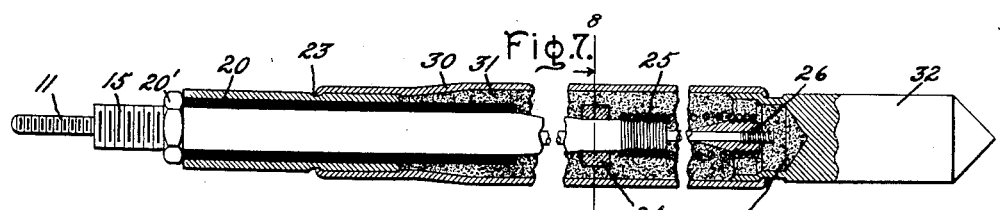
Figure 9:
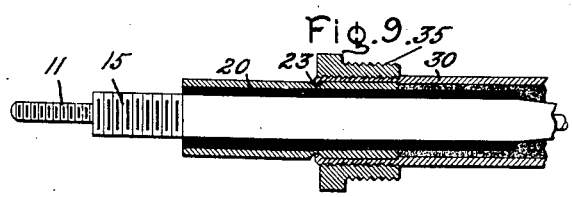
Figure 8:
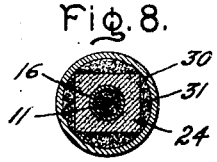
Figure 10:
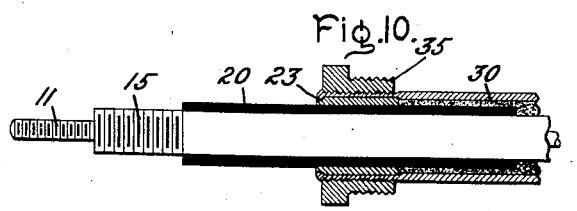

For a better understanding of my invention reference should be had to the accompanying drawings in which Fig. 1 is an assembly view of a heating unit constructed in accordance with my invention; Fig. 2 shows the solid metallic terminal; Fig. 3 is a view partly in section showing the assembly of the solid and tubular terminals before the swaging operation; Fig. 4 is an assembly view of the two terminals after the swaging operation; Fig. 5 is a view partially in section showing the insulator before it is swaged; Fig. 6 is a view in section showing the completed insulator; Fig. 7 is a view partially in section showing the heating unit assembled before the final swaging operation; Fig. 8 is a sectional view along the line 8—8 of Fig. 7, looking in the direction of the arrows; Fig. 9 is a view partially in section of the terminal end of the heating unit after the final swaging operation showing the supporting bushing applied thereto; Fig. 10 is a view similar to Fig. 9 showing the insulator exposed; Fig. 11 is an elevation view partially in section showing the application of the heating unit to a steam boiler; Fig. 12 is a view partially in section of a modification of my invention showing the method of assembling the unit; Fig. 13 is an end elevation view of Fig. 12, while Fig. 14 is a view partially in section showing the completed modified form of my invention.

Referring to the drawings, the construction of the completed heating unit 10 (Fig. 1) showing one embodiment of my invention, will best be understood with reference to the various steps in the manufacture of the unit. A solid metallic rod 11 (Fig. 2), forming a terminal, is swaged or otherwise formed to have an enlarged portion 12 at its left hand end, and a slightly reduced portion 13 at its right hand end. The rod 11 is threaded at its large end for a short distance and then inserted in a tubular metallic terminal member 14 (Fig. 3) which is formed with an enlarged portion 15 at its left hand end. The enlarged portion 12 of rod 11 is adjacent the enlarged end 15 of the tubular member and is secured in a central position by means of a conical washer 17 which is tapped and screwed on the rod for a short distance, the tubular member being countersunk to provide a seat for the washer. The tubular member is then spun over to retain the washer in place. Rod 11 is considerably longer than the tubular member so that its small portion 13 projects from the tubular member. A suitable loading tool is now applied to the right hand end of the tubular member to hold rod 11 in a central position, and the tubular member filled with a suitable powdered heat refractory insulating material 18, such as magnesium oxide, the tubular member being vibrated meanwhile to distribute the insulating material evenly, after which the loading tool is removed and the end of the tubular member closed by a conical washer 19 which is slipped over rod 11. The tubular member is countersunk to receive the washer 19 and is spun over to secure it in place.

The tubular member is now subjected to a swaging process in order to compact the powdered magnesium oxide to a solid dense mass, the tubular member being thereby reduced in diameter (Fig. 4). A short length 16 at the right hand end of the tubular member is swaged to a slightly smaller diameter than the central portion. The washers 17 and 19 are next cut or turned off, washer 17 being unscrewed from the rod 11 while washer 19 is readily slipped off. The object in using conical washers is to prevent disfiguration of the rod 11 during the swaging operation. It will be observed that upon the reduction in size of the tubular member, the washers readily collapse without denting or otherwise injuring the rod. As thus constructed, the tubular member and the rod are held rigidly together in insulated relation with each other by the compacted insulating material. The ends of the tubular member and the small end of the rod are now threaded as shown in Fig. 4. The terminals are now ready to be assembled in the heating unit with a cylindrical insulator 20, shown in Figs. 5 and 6, assembled on the enlarged portion 15 of the tubular terminal.

The insulator 20 (Fig. 5) is made up of a layer of insulating material $21^a$, such as mica, and a layer of yieldable heat refractory material $21^b$, such as asbestos, which are wound on a suitable rod 21, the asbestos having previously been given a coating of china wood oil. The layers of asbestos and mica are thus wound in the form of a spiral and a tube built up having alternate layers of asbestos and mica. The insulator is wound to the proper size to be slipped snugly in a metallic sleeve 22 of equal length, as shown in Fig. 5. The sleeve is now subjected to a swaging operation whereby its diameter is reduced and the alternate layers of asbestos and mica are compacted. In the next step the insulator is baked, the china wood oil uniting the asbestos and mica into a solid mass, after which an annular groove 23 is formed in the sleeve near the left hand end, the sleeve cut away for a short distance at the right hand end, and rod 20 removed, as shown in Fig. 6. During the swaging operation, the yieldable asbestos material permits the mica to adjust itself without breaking, crumbling or otherwise having its insulating properties destroyed. The insulator has very good insulating properties and is also adapted to withstand high temperatures.

In the assembly of the heating unit, as shown in Fig. 7, a square spacing block 24 of insulating material, such as lava, having a central opening is slipped on the small portion 16 of the tubular terminal, and a resistance conductor 25, which is in the form of a helix, is secured at one end by screwing it on the threaded portion 16, then stretched to separate its turns and secured at its other end in a similar manner to a collar 26 which is threaded on the small end of the terminal 11. Collar 26 is turned on terminal 11 at the same time that it is screwed into the resistance coil. It is partially threaded on terminal 11 before entering the resistance coil so that terminal 11 extends through the collar for a short distance when the parts are assembled. The terminals together with the resistance conductor assembled thereon are next inserted in a tubular metallic sheath or casing 30, the left hand end of which is reduced in diameter and counterbored to receive the insulator 20, which fits tightly on the enlarged section 15 of the tubular terminal and is secured thereon by a nut 20'. The exposed end of the insulator is within the sheath. The left hand end of sheath 30 is next spun over into the groove 23 so as to secure the insulator thereto, the inner end of the tubular terminal being held central meanwhile with the sheath by the square spacing block 24, which is of such size that its corners engage the sheath, as shown in Fig. 8. It will be observed that the spacing block is secured on portion 16 of the tubular terminal by the adjacent end of the resistance conductor. A suitable loading tool is then placed in the right hand end of the sheath so as to engage the end of terminal 11 and hold the terminal under tension in a central position in the sheath. The sheath is then filled with a suitable powdered heat refractory insulating material 31, such as magnesium oxide, through suitable openings in the loading tool and past the sides of the square centralizing block 24, the sheath being vibrated meanwhile. The right hand end of the sheath is closed by means of an elongated member 32 which is forced tightly into the sheath and the end of the sheath spun over into a groove in the member so as to hold it securely in place. The inner end of member 32 is provided with a recess 33.

The entire unit is now subjected to a swaging process whereby the magnesium oxide is compacted to a hard dense mass around the turns of the resistance conductor 25, the terminals, and the insulator 20. The sheath 30 is reduced by the swaging operation to a uniform diameter which is slightly less than the original diameter of its left hand end. Insulator 20 is thereby firmly secured to the sheath and the tubular terminal. The recess 33 in the inner end of member 32 is provided to permit the swaging of the unit without injuring the sheath at this point. It will be observed that the walls of the member 32 around the recess will be uniformly reduced by the swaging operation, while if the member were solid at this point there would be a tendency for the swaging to unduly reduce the thickness of the sheath. The length of the insulator 20 within the sheath, around which the powdered insulator material is tightly compacted, provides a relatively long electrical clearance between the tubular terminal and the sheath.

After the swaging operation a brazed or welded joint 34 (Fig. 1) is made between the sheath and member 32 for the purpose of preventing the entrance of moisture. The left hand end of the sheath adjacent the insulator is then threaded and a standard pipe bushing 35 screwed in place thereon, as shown in Fig. 9. The metallic sleeve 22 is next cut away even with the end of the sheath, as shown in Fig. 10, so as to expose the insulator 20 and increase the electrical clearance at this point between the sheath and the tubular terminal. To complete the assembly of the heating unit as shown in Fig. 1, a molded insulating piece 36 is placed over the exposed portion of insulator 20 for the purpose of protecting the insulator from injury. The molded piece is held in position by means of nut 37 which is screwed on the projecting threaded end of the tubular terminal and seated on a metallic washer 38 resting against an insulating washer 39 adjacent the insulator 36. Nuts 40 and 41 are provided on the threaded end of the tubular terminal to facilitate the connection of conductors leading to a suitable source of electrical supply. A metallic collar 42 is next threaded on the tubular terminal, an insulating washer 42' placed over the threaded end of terminal 11, and then a metallic washer 43 against which a nut 44 is firmly seated. Collar 42 prevents nut 40 from being screwed against insulating washer 42' and damaging it. Nuts 45 and 46 are provided on the exposed end of terminal 11 for effecting a connection to the source of electrical supply.

In Fig. 11 are shown heating units 10 and 10', constructed as previously described, mounted in a steam boiler 47 of the vertical type. The heating units are inserted through tapped holes in the boiler head and extend downward the full length of the boiler. They are held at their upper ends by securing their respective bushings 35 in tapped holes in the boiler head. The lower ends of the heating units are spaced and held against jar and vibration by means of the members 32 which engage openings in a bracket 50 secured adjacent the lower end of the boiler. The members 32 are freely movable in a longitudinal direction with respect to the bracket 50 to provide for expansion and contraction of the heating unit due to changes in temperature. Under normal conditions of operation the heating unit is immersed in water throughout that portion of its length which carries the resistance conductor 25. The tubular terminal extends into the sheath for a distance equal to the height of the steam space at the top of the boiler. For the sake of simplicity, only two heating units are shown in this figure of the drawing. It is contemplated, however, that any required number of the heating units will be spaced along the circumferences of circles concentric with the boiler. The heating units may be connected in series or parallel or both as desired in accordance with the voltage of the supply source. By connecting a number of units in series the boiler may be operated on a supply source of comparatively high voltage.

In the modification of my invention shown in Figs. 12, 13 and 14, the terminals project from opposite ends of the sheath. In the construction of this heating unit, terminals 60 and 61 are each threaded at one end. The helical resistance conductor 62 is secured to the terminals by screwing its ends on the threaded ends of the terminals. The two terminals with the resistance conductor secured thereto are inserted in the cylindrical sheath 64 and project from opposite ends of the sheath. Terminal 61 is held central with the sheath by a cylindrical insulator 65 which is inserted in the sheath and fits loosely around the terminal. A metallic washer 66 is placed over the insulator and the terminal secured by a clip 67 which engages a groove in the terminal. Terminal 60 is held in position central with the sheath by means of a loading tool 68 inserted in the casing. The loading tool 68 is substantially the size of insulator 65. It is provided with a plurality of radial slots 69 and with a projecting portion 70 against which a clip 71, secured to the terminal, rests, thus holding the terminal in place in such position that the resistance conductor is stretched separating its turns. Additional means consisting of square insulating blocks 72 and 73 are provided near the inner ends of the terminals for maintaining them in alignment with the sheath. The sheath is next filled with a suitable powdered heat refractory insulating material 74, such as magnesium oxide, through the radial openings 69 in the loading tool, after which clip 71 is taken off, the loading tool is removed by means of projecting portion 70, and an insulator 75 (Fig. 14) similar to insulator 65 inserted in place of the loading tool. Insulator 75 is temporarily secured by a washer (not shown) as disclosed in connection with insulator 65, both ends of the casing being spun over to hold the washers in place. Clip 71 is again placed in its original position on terminal 60, which position, it will be observed, is a short distance from the left hand end of the sheath due to the positioning effect of projection 70 on the loading tool. With this exception the left hand end of the assembled unit has the appearance of the right hand end.

The entire unit is now subjected to a swaging process whereby the diameter of the casing is reduced with the result that the powdered insulated material is compacted to a hard dense mass around the terminals, the resistance conductor and the insulators. The insulators are also reduced in diameter and thus secured tightly to the casing and the terminals. Due to the increase in length of the casing, terminal 60 gradually pulls in during the swaging operation until clip 71 rests against the metallic washer in the left hand end of the casing. The ends of the casing are now cut back a short distance to expose the ends of the insulators and provide increased electrical clearance between the terminals and the casing. The inner ends of the insulators 65 and 75 are stepped-down in order to increase the electrical clearance at these points. The insulators may be constructed of alternate layers of mica and asbestos as previously described in connection with insulator 20. For low temperature units bakelite or such other insulating material as will withstand the swaging operation may be used.

In the completion of this modification of my invention connectors 76 and 77 are connected to the terminals. The connectors are secured to the terminals by forming longitudinal openings in the connector into which the ends of the terminals are inserted, the ends of the terminals having been previously provided with annular notches 78. The connectors are now subjected to a swaging operation which forces the metal into the notches, thus making a solid connection with the terminals, and also securing the connectors tightly against the outer ends of the insulators. The outer ends of the connectors are threaded and provided with suitable means, such as nuts, for making connection with a source of electrical supply.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. An electric heating unit comprising a metallic sheath, powdered heat refractory insulating material compacted to a hard dense mass within said sheath, a resistance conductor embedded in said insulating material, a terminal for said conductor projecting from the sheath, and a metallic sleeve and insulator surrounding the projecting terminal and having one end secured within the sheath.

2. An electric heating unit comprising a metallic sheath, a metallic rod extending longitudinally thereof and having one end projecting therefrom, a tubular metallic member surrounding the projecting end and insulated therefrom, powdered heat refractory insulating material within the sheath and a resistance conductor embedded in said material having one end connected to the rod and the other end connected to the tubular member whereby both terminals of the conductor are at one end of the sheath.

3. An electric heating unit comprising a metallic sheath, powdered heat refractory insulating material compacted to a hard dense mass within said sheath, a resistance conductor embedded in said insulating material, and terminals for said resistance conductor embedded in said insulating material comprising a metallic rod extending longitudinally of said sheath and a tubular metallic member surrounding said rod and extending into said sheath.

4. An electric heating unit comprising a metallic sheath, powdered heat refractory insulating material compacted to a hard dense mass within said sheath, a resistance conductor embedded in said insulating material, a terminal for the resistance conductor, and an insulator for said terminal having one end embedded in said insulating material and the other end extending without the sheath.

5. An electric heating unit comprising a metallic sheath, powdered heat refractory insulating material compacted to a hard dense mass within said sheath, a resistance conductor embedded in said insulating material, a terminal for the resistance conductor, and a solid insulator for said terminal having one end surrounded by said insulating material and the other end extending without said sheath.

6. An electric heating unit comprising a sheath, powdered heat refractory insulating material in said sheath, a resistance conductor embedded in said insulating material, and terminals for said resistance conductor projecting from one end of said sheath.

7. An electric heating unit comprising a sheath, powdered heat refractory insulating material in said sheath, a resistance conductor embedded in said insulating material, terminals for said resistance conductor projecting from one end of said sheath, and an insulator surrounding said terminals.

8. An electric heating unit comprising a sheath, powdered heat refractory insulating material in said sheath, a resistance conductor embedded in said insulating material, terminals for said resistance conductor embedded in said insulating material and projecting from one end of said sheath, and an insulator surrounding said terminals and extending from said sheath.

9. An electric heating unit comprising a metallic sheath, powdered heat refractory insulating material in said sheath, a resistance conductor embedded in said insulating material, a terminal for said resistance conductor, a tubular terminal surrounding the former terminal and separated therefrom by said insulating material, and an insulator on said tubular terminal.

10. An electric heating unit comprising a metallic sheath, powdered heat refractory insulating material compacted to a hard dense mass within said sheath, a resistance conductor embedded in said insulating material, a terminal for the resistance conductor, and a cylindrical insulator surrounding said terminal and secured intermediate its ends to said sheath by swaging, said insulator comprising alternate layers of insulating material and yieldable heat refractory material.

11. An electric heating unit for steam boilers comprising a metallic sheath, powdered heat refractory insulating material compacted to a hard dense mass within said sheath, a resistance conductor embedded in said compacted insulating material, a solid metallic terminal for said resistance conductor embedded in said compacted insulating material, a tubular metallic terminal surrounding said solid terminal and separated therefrom by said compacted insulating material, and a cylindrical insulator on said tubular terminal comprising alternate layers of abestos and mica, one end of said insulator extending into said compacted insulating material and the other projecting from the sheath.

12. The method of forming an electric heating unit which consists in securing a resistance conductor to a terminal, inserting the same in a metallic sheath, supporting the terminal in a solid insulator, filling the space around the resistance conductor with powdered heat refractory insulating material, and reducing the diameter of the sheath to compact the powdered insulating material and secure the insulator in the sheath and on the terminal.

13. The method of forming a heating unit which consists in securing a resistance conductor to a pair of terminals, inserting the same in a cylindrical sheath, supporting the terminals in the sheath by means of a solid insulator, filling the sheath with powdered heat refractory insulating material, closing the sheath with a metallic supporting member, and then swaging the unit to compact the insulating material around the conductor, the terminals and the insulator.

14. An electric heating unit for steam boilers comprising an elongated metallic sheath adapted to be inserted in the boiler and secured thereto at its outer end, compacted powdered heat refractory insulating material in said sheath, a resistance conductor embedded in said insulating material, and terminals for the resistance conductor projecting from the outer end of the sheath.

15. An electric heating unit for steam boilers comprising an elongated metallic sheath adapted to be inserted in the boiler, a bushing near the outer end for securing the sheath in said boiler, a spacing projection on the inner end of said sheath, a resistance conductor in said sheath in intimate thermal relation therewith, and terminals for the resistance conductor projecting from the outer end of the sheath.

16. The combination with a swaged electric heating unit of an insulator therefor comprising layers of yieldable heat refractory material and insulating material wound into a cylinder and compacted by swaging.

17. The combination with a swaged electric heating unit of an insulator therefor comprising layers of insulating material separated by layers of yieldable heat refractory material, said insulator being compacted and secured by the swaging of the heating unit.

18. The combination with an electric heating unit compacted by swaging, of a cylindrical insulator therefor comprising alternate layers of mica and asbestos, said insulator being secured and compacted by the swaging operation.

In witness whereof, I have hereunto set my hand this 3rd day of October, 1921.

CHARLES C. ABBOTT.